Patented Nov. 4, 1924.

1,514,571

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

PROCESS OF VULCANIZING CAOUTCHOUC AND PRODUCT OBTAINED THEREBY.

No Drawing.  Application filed August 14, 1923. Serial No. 657,429.

*To all whom it may concern:*

Be it known that I, LORIN B. SEBRELL, a citizen of the United States, and resident of Akron, Ohio, have invented new and useful Improvements in Processes of Vulcanizing Caoutchouc and Products Obtained Thereby, of which the following is a specification.

My invention relates to vulcanized caoutchouc products and to the art of producing them, with particular reference to the acceleration of the vulcanization thereof.

In the manufacture of most rubber articles a compound of rubber, or a mixture of caoutchouc and a filler, is employed, which is vulcanized by incorporating in the mix a vulcanizing agent, such as sulfur. Although a mixture of this type will vulcanize when subjected to heat for a sufficient length of time, it is desirable to employ a catalyst or an accelerating agent which increases the rate of vulcanization, thereby reducing the expense of manufacture and improving the quality of the rubber products. There are, of course, a relatively large number of accelerating agents now known to manufacturers of rubber, but most all of them have particular applications or characteristics which make them especially suitable for use in certain types of rubber articles, but, on the other hand, they may be objectionable for incorporation in certain other types of articles. Consequently, it is necessary, in the manufacture of a variety of rubber products, to have various types of accelerators that may be applied as their particular characteristics especially adapt them for use.

It is desirable in some instances to employ an accelerating agent which shall be especially powerful, and, consequently, insure very rapid vulcanization to obtain a high quality product for certain purposes. I have discovered that substituted thio-ureas obtained from primary aromatic amines containing hydrocarbon residues, otherwise known as hydrocarbon or alkyl groups, more particularly those substituted thio-ureas produced by the reaction of carbon bisulfide with aromatic amines having alkyl substituents in meta position with respect to each other, which class of substituted thio-ureas may be otherwise defined as aryl substituted thio-ureas having alkyl groups in meta position with respect to each other, have the desired property, when used as an accelerator, of effecting a cure in a very short time.

The class of chemical compounds to which the accelerator contemplated by my invention belongs may be represented by the following formula:

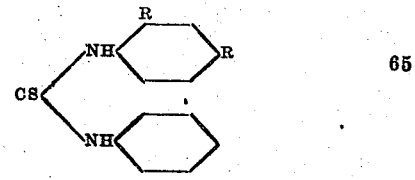

wherein R may be any hydrocarbon or alkyl radical, such as $CH_3$. A hydrocarbon radical may be either in one phenyl group, as indicated in the formula as above shown, or in both phenyl groups as, for example, di-meta-xylyl-thio-urea. The compound represented by this group is prepared by a reaction of carbon bisulfide with 4-amino-meta-xylene, which reaction may be represented as follows:

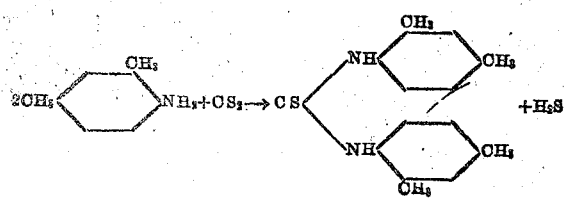

An accelerator may also be prepared by the reaction of carbon bisulfide with technical xylidine, which is a mixture of the several xylidines among which may be mentioned the following compounds:

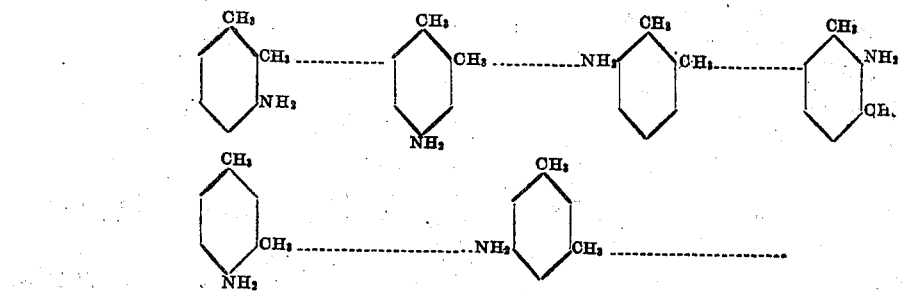

When technical xylidine is employed to produce an accelerator by reaction with carbon bisulfide, the product may be an aryl substituted thio-urea having alkyl groups in positions other than meta, as, for example, in ortho position with respect to each other, the product being, therefore, a mixture of several different thio-ureas.

The process of utilizing my invention may be illustrated by the following example:
100 parts of rubber,
5 parts of zinc oxide,
6 parts of sulfur, and
2.8 parts of accelerator.

If such ingredients are thoroughly mixed and subjected to heat at a temperature corresponding to 40 lbs. of steam pressure for twenty minutes, the compound is slightly overcured, and about fifteen minutes suffices to produce a well cured product. In order to illustrate the relative curing power of my accelerator, the same compound was utilized with the exception of the amount of accelerator incorporated therein, and in one instance thio-carbanilide was substituted, 2.28 parts being mixed with the ingredients. The weight relations of the amounts of the accelerators being such that equimolar portions were employed. A good cure of the latter compound was obtained in one hour and twenty minutes at a temperature corresponding to 40 lbs. of steam pressure.

A further comparison was made by mixing 2.56 parts of di-ortho-tolyl-thio-urea in the foregoing compound, which was subjected to 40 lbs. of steam pressure for about fifty minutes to obtain a good cure. It will be noted, therefore, that the meta-xylyl-thio-urea produces a good cure in substantially one-third of the time necessary when either thiocarbanilide or di-ortho-tolyl-thio-urea are utilized in a similar compound. It shows, therefore, that inasmuch as meta-xylyl-thio-urea possesses greater accelerating power, it is only necessary to use approximately one-third as much of the accelerator upon an equimolar basis to obtain a good cure in the same length of time as the other accelerators herein mentioned.

It will be understood that although I have mentioned zinc oxide as the filler and sulfur as the vulcanizing agent in the foregoing example, either or both may, if desired, be replaced by other ingredients having the same general functions respectively.

Although I have given specific examples of procedure and have mentioned di-meta-xylyl-thio-urea as one of the preferred accelerators of the class used in a rubber compound including zinc oxide and sulfur, it will be understood that I do not regard the invention as dependent upon the specific procedure or materials mentioned, except in so far as such limitations are included within the terms of the claims appended hereto.

What I claim is:

1. A process of vulcanizing caoutchouc that comprises incorporating with a caoutchouc mix an aryl substituted thio-urea having two substituted alkyl groups on one or both benzene rings and vulcanizing the mix.

2. A process of vulcanizing caoutchouc that comprises incorporating with a caoutchouc mix an aryl substituted thio-urea having two alkyl groups in meta position to each other and vulcanizing the mix.

3. A process of vulcanizing caoutchouc that comprises incorporating with a caoutchouc mix an aryl substituted thio-urea having two substituted alkyl groups, one of which is in meta position to the other and vulcanizing the mix.

4. A process of vulcanizing caoutchouc that comprises incorporating with a caoutchouc mix a meta-xylyl-thio-urea and vulcanizing the mix.

5. A process of vulcanizing caoutchouc that comprises incorporating with a caoutchouc mix di-meta-xylyl-thio-urea and vulcanizing the mix.

6. The process of vulcanizing caoutchouc that comprises bringing together under reacting conditions carbon bisulfide and an aromatic amin having two alkyl substituents in meta position with respect to each other, incorporating the resulting product in the caoutchouc mix and vulcanizing the mix.

7. The process of vulcanizing caoutchouc that comprises bringing together under reacting conditions carbon bisulfide and xylidine, to produce an aryl substituted thiourea having two alkyl groups on each benzene ring, incorporating the resulting product in a caoutchouc mix and vulcanizing the mix.

8. The process of vulcanizing caoutchouc that comprises bringing together under reacting conditions carbon bisulfide and 4-amino-meta-xylene, incorporating the resulting product in a caoutchouc mix and vulcanizing the mix.

9. A vulcanized caoutchouc product produced by the reaction of caoutchouc, a vulcanizing agent and an aryl substituted thiourea accelerator having two alkyl groups in meta position with respect to each other.

10. A vulcanized caoutchouc product produced by the reaction of caoutchouc, a vulcanizing agent and meta-xylyl-thio-urea as an accelerator.

11. A vulcanized caoutchouc product produced by the reaction of caoutchouc, a vulcanizing agent and di-meta-xylyl-thio-urea as an accelerator.

12. A vulcanized caoutchouc product produced by the reaction of caoutchouc, a vulcanizing agent and an accelerator formed by the reaction of carbon bisulfide and 4-amino-meta-xylene.

In witness whereof, I have hereunto signed my name in the presence of two subscribing witnesses.

LORIN B. SEBRELL.

Witnesses:
O. E. BEE,
F. A. LIND.